United States Patent
Kelly

(10) Patent No.: US 8,894,222 B2
(45) Date of Patent: Nov. 25, 2014

(54) OVERHEAD SUPPORT SYSTEM FOR A LIGHT PROJECTION SYSTEM

(75) Inventor: Shawn L. Kelly, Colorado Springs, CO (US)

(73) Assignee: Panamorph, Inc., Colorado Springs, CO (US)

( * ) Notice: Subject to any disclaimer, the term of this patent is extended or adjusted under 35 U.S.C. 154(b) by 321 days.

(21) Appl. No.: 13/411,557

(22) Filed: Mar. 3, 2012

(65) Prior Publication Data

US 2012/0224152 A1   Sep. 6, 2012

Related U.S. Application Data

(60) Provisional application No. 61/448,798, filed on Mar. 3, 2011.

(51) Int. Cl.
| | |
|---|---|
| G03B 21/14 | (2006.01) |
| H04N 5/225 | (2006.01) |
| G03B 21/54 | (2006.01) |
| F16M 13/02 | (2006.01) |
| F16M 11/04 | (2006.01) |
| F16M 11/20 | (2006.01) |
| F16M 11/10 | (2006.01) |

(52) U.S. Cl.
CPC ............ G03B 21/54 (2013.01); F16M 13/027 (2013.01); F16M 11/048 (2013.01); F16M 11/2014 (2013.01); G03B 21/147 (2013.01); F16M 11/2092 (2013.01); G03B 21/142 (2013.01); F16M 11/10 (2013.01); F16M 11/045 (2013.01)
USPC ............................ 353/119; 353/100; 348/373

(58) Field of Classification Search
CPC ...... G03B 21/54; G03B 21/14; F16M 11/045; F16M 13/027; F16M 11/048; F16M 11/06
USPC ............................ 353/100, 119, 122; 348/373
See application file for complete search history.

(56) References Cited

U.S. PATENT DOCUMENTS

| | | | | |
|---|---|---|---|---|
| 7,029,133 B2 * | 4/2006 | Challis | ......................... | 353/119 |
| 2009/0316118 A1 * | 12/2009 | Dittmer | ........................ | 353/119 |

* cited by examiner

*Primary Examiner* — Georgia Y Epps
*Assistant Examiner* — Magda Cruz
(74) *Attorney, Agent, or Firm* — Raggio & Dinnin, P.C.

(57) ABSTRACT

A supplemental optic system supported by a forward support structure azimuthally hinged from a forward portion of a track of an overhead support system cooperates with a light projector operatively coupled to the track. The track is suspended from a slider operatively coupled to a support post depending from an associated ceiling mount structure. The position of the slider within the track provides for minimizing the torque on the support post as a result of the distribution of weights of the light projector and the supplemental optic system.

27 Claims, 5 Drawing Sheets

OVERHEAD SUPPORT SYSTEM FOR A LIGHT PROJECTION SYSTEM

CROSS-REFERENCE TO RELATED APPLICATIONS

The instant application claims the benefit of prior U.S. Provisional Application Ser. No. 61/448,798 filed on 3 Mar. 2011, which is incorporated by reference herein in its entirety.

DESCRIPTION OF EMBODIMENT(S)

Figure 1:
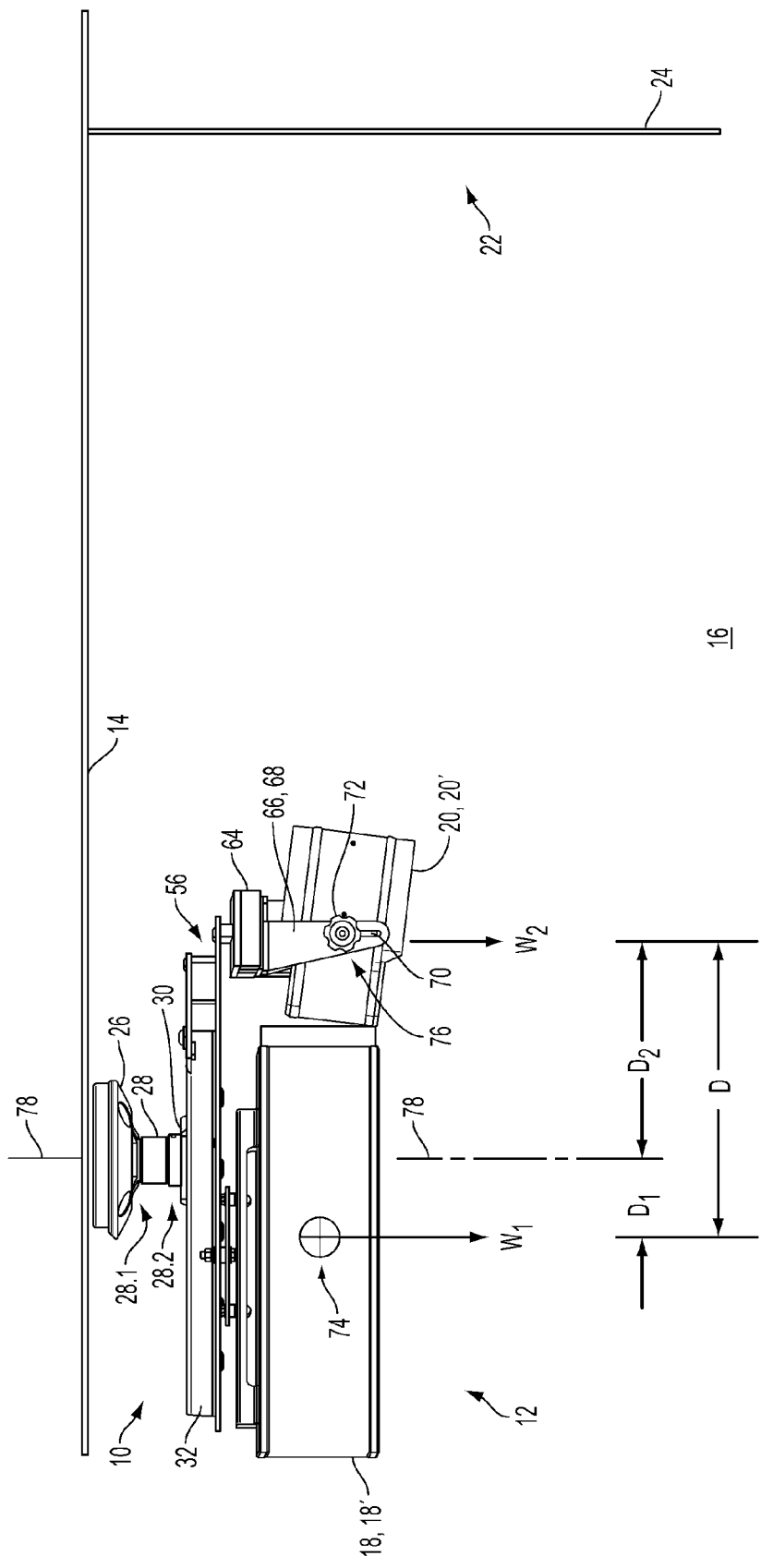
FIG. 1 illustrates a light projection system comprising a light projector and an associated supplemental optic system suspended from an associated overhead support system attached to the ceiling of a room.
Figure 2:
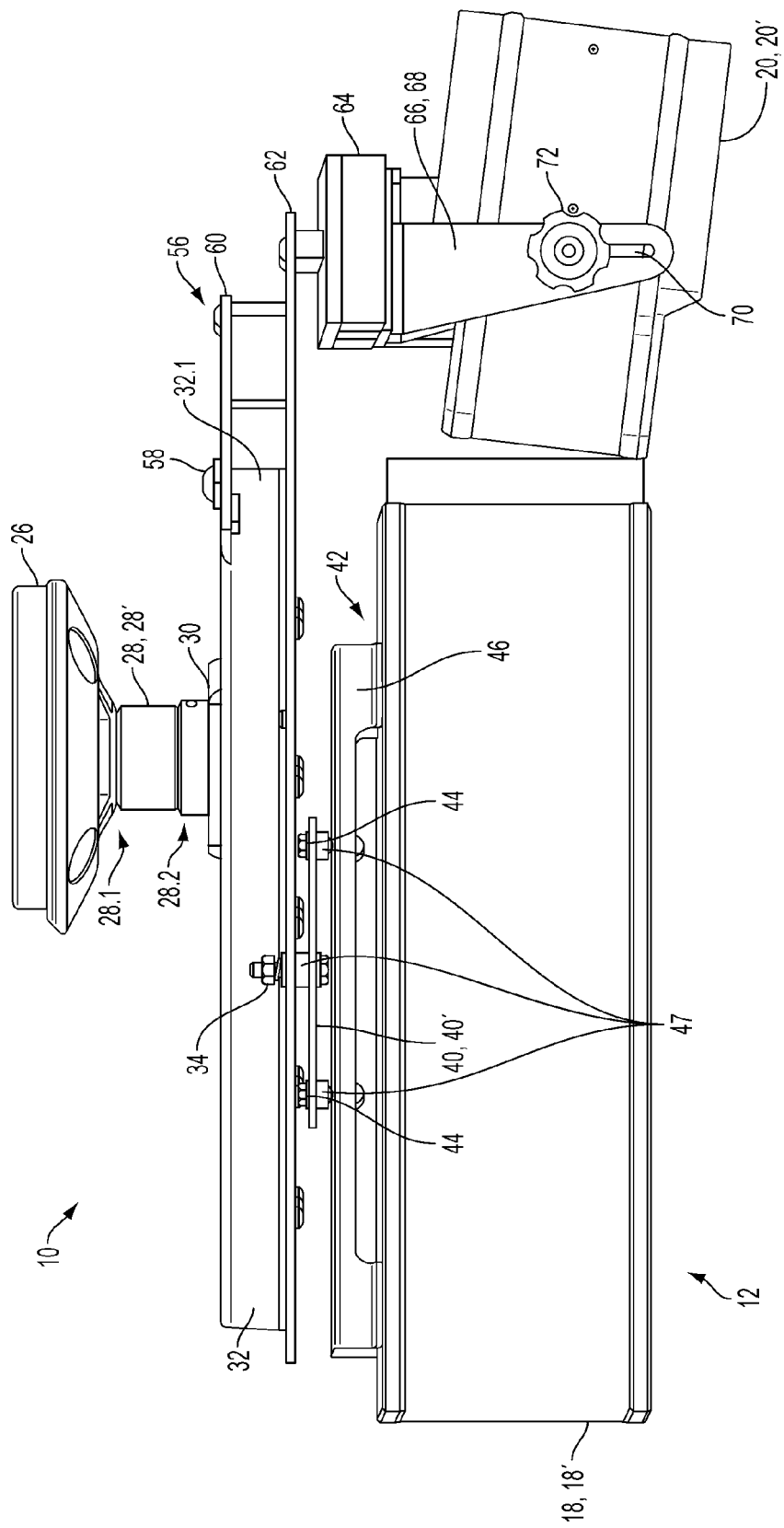
FIG. 2 illustrates a side view of the light projection system and associated overhead support system illustrated in FIG. 1.
Figure 3:
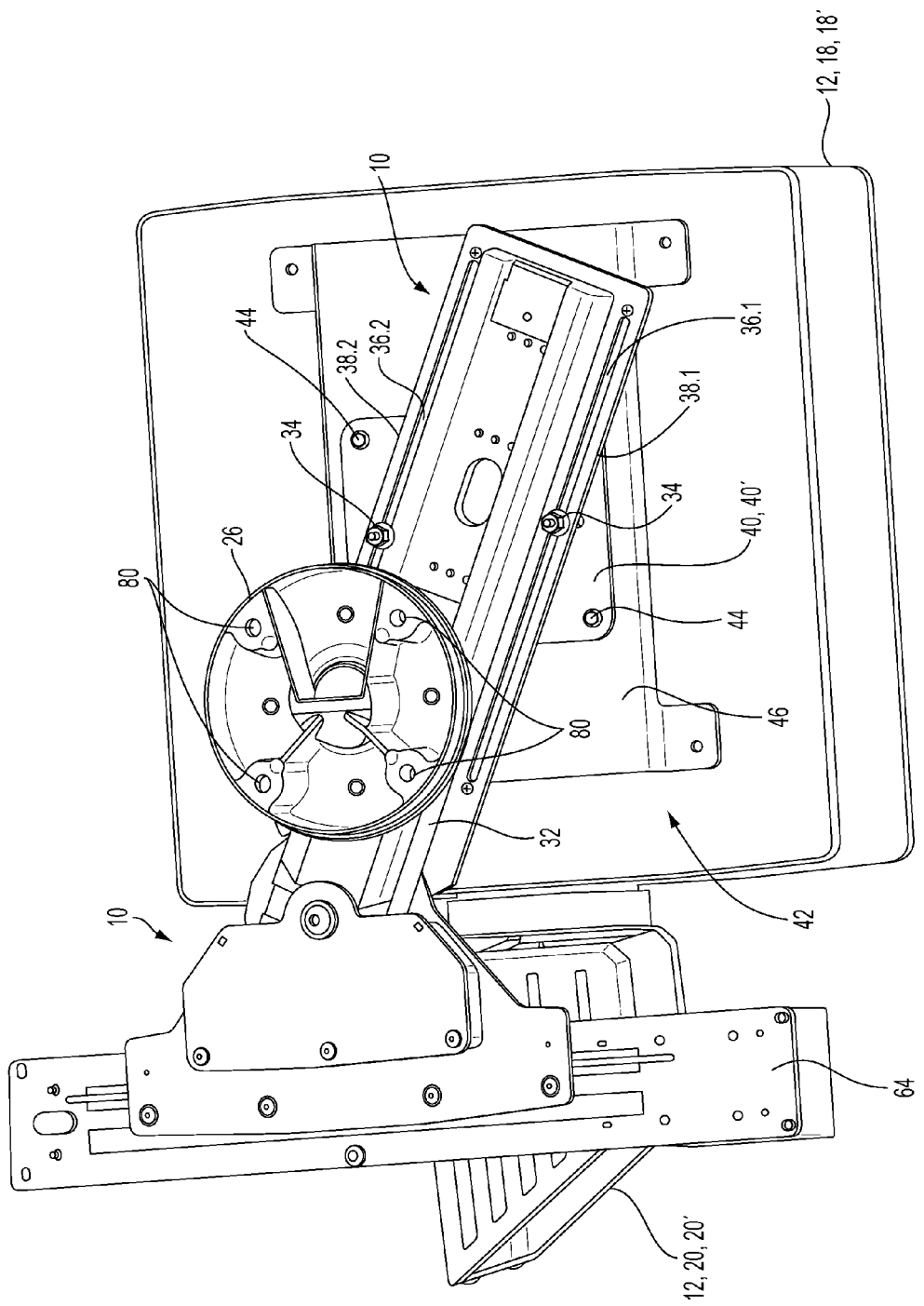
FIG. 3 illustrates a first perspective view of the light projection system and a first aspect of the associated overhead support system illustrated in FIGS. 1 and 2.

Referring to FIG. 1, an overhead support system 10 provides for supporting a light projection system 12 from the ceiling 14 of a room 16, wherein the light projection system 12 comprises a light projector 18 in cooperation with a supplemental optic system 20 that together provide for projecting images 22 onto a projection screen 24 that, for example, is also suspended from the ceiling 14 at a relatively forward location within the room 16. For example, in one embodiment, the light projector 18 comprises a digital light projector 18' and the supplemental optic system 20 comprises either an expansion or reduction lens so as to provide for changing the size of the image 22, and/or an anamorphic lens 20' so as to provide for changing the shape of the image 22. For example, in one embodiment, the supplemental optic system 20 comprises an anamorphic lens 20' constructed in accordance with the teachings of either U.S. Pat. No. 6,678,095 that issued on 13 Jan. 2004, or U.S. Pat. No. 7,995,282 that issued on 9 Aug. 2011, both of which are incorporated herein by reference in their entireties.

Referring also to FIGS. 2-5, the overhead support system 10 comprises a ceiling mount structure 26, i.e. a suspendable mount structure 26, that either incorporates a support post 28 depending therefrom therebelow, or is operatively coupled to an upper end 28.1 of the support post 28. A lower end 28.2 of the support post 28 is operatively coupled to or incorporates a slider 30 that is adapted to engage with and slide along an associated track 32 that is operatively coupled to the light projector 18, for example, with a pair of fasteners 34 through a corresponding pair of slots 36.1, 36.2 on opposing side flange portions 38.1, 38.2 of the track 32, wherein the fasteners 34 provide for securing the track 32 to a projector interface structure 40 operatively coupled to or a part of a top portion 42 of the light projector 18. The track is sufficiently rigid and strong so as to provide for supporting the weights of the light projector 18 and the supplemental optic system 20 and so as to provide for substantially maintaining the relative positions thereof during the operation thereof. For example, in one embodiment, the projector interface structure 40 comprises a plate 40' that is fastened to the top portion 42 of the light projector 18 with a plurality of associated fasteners 44, wherein the top portion 42 of the light projector 18 comprises an associated interface adapter 46 that is fastened—for example, either screwed, riveted or welded—to the light projector 18.

In one embodiment, the projector interface structure 40 is adapted to provide for adjusting the tilt of the light projector 18 about its optic axis so as to provide for rotationally aligning the projected image 22 with the projection screen 24 (i.e. in a roll direction). For example, referring to FIG. 2, in one embodiment, spring washers 47 located between the projector interface structure 40 and the track 32, and between the projector interface structure 40 and the interface adapter 46, so that the associated gaps therebetween are biased open and controlled by the corresponding associated fasteners 34, 44, so as to provide for adjusting the corresponding associated gaps between the projector interface structure 40 and the track 32 or interface adapter 46 associated with each of the corresponding associated fasteners 34, 44 by adjustment of the corresponding associated fasteners 34, 44, so as to provide for adjusting the roll tilt of the light projector 18 about the optic axis thereof, relative to the track 32.

In one embodiment, the support post 28 comprises a cylindrical pipe or shaft 28' with an externally-threaded lower end 28.2' that is then treaded into a corresponding internally-threaded central portion 48 of the slider 30. Generally, the support post 28 provides for suspending the track 32 from an overhead location, and provides for azimuthally pivoting (i.e. in a yaw direction) the track 32 relative to the suspendable mount structure 26. For example, alternatively, the support post 28 could be either internally or externally threaded at either end, and may be incorporated as a portion of either the suspendable mount structure 26 or the slider 30. Furthermore, the support post 28 could alternatively use a different rotary, thrust-supporting joint so as to provide for yaw adjustment while suspending the track 32, for example, using a transverse pin through an associated cylindrical pipe or shaft 28' that engages with an associated transverse thrust reactive surface. Yet further, the support post 28 could alternatively be supported with one or more adjustment screws that extend radially inward from a surrounding collar of either the suspendable mount structure 26 or the slider 30 that cooperate with a corresponding circumferential groove on the cylindrical pipe or shaft 28.

The track 32 comprises a pair of opposing longitudinal sides 50.1, 50.2, each incorporating a corresponding internal longitudinal groove 52.1, 52.2 that together constitute a "T-slot" 54 within which corresponding fore 54.1 and aft 54.2 flanges of the slider 30 are engaged so as to provide for suspending the track 32 from slider 30 and so as to provide for the slider 30 to slide longitudinally within the track 32. The particular configuration of the track 32 is not limiting. For example, the track 32 could comprise external grooves or one or more rails with either T-shaped, circular, or polygon-shaped cross sections, that cooperate with corresponding features of the associated one or more sliders 30. For example, in one alternative embodiment, the one or more sliders 30 could incorporate one or more pairs of laterally-spaced linear bearings that slide along a corresponding pair of rails, for example, circular-shaft rails extending through the linear bearings. As another example, in another alternative embodiment, the track 32 could comprise a single rail having a polygonal—for example, rectangular—cross-section, that extends through the one or more sliders 30, each of which at least partially surrounds a cross-section of the track 32. Furthermore, the track 32 need not necessarily be straight.

The supplemental optic system 20 is supported by a forward support structure 56 that is operatively coupled to the forward end 32.1 of the track 32 with an associated hinge bolt 58 that extends through an upper plate 60 and into a lower plate 62 of the forward support structure 56 between which the forward end 32.1 of the track 32 can pivot azimuthally (i.e. in a yaw direction). The lower plate 62 of the forward support structure 56 is operatively coupled to a structure 64 that supports the supplemental optic system 20. More particularly, in one embodiment an anamorphic lens 20' is supported between a pair of vertically descending arms 66 of a frame 68 supported by the structure 64, wherein each arm incorporates a corresponding vertically oriented slot 70 through which a corresponding knobbed adjusting screw 72 provides for securing the anamorphic lens 20' thereto and that provides for adjusting the relative height of the anamorphic lens 20' relative to the light projector 18, and that provides for adjusting the elevation (i.e. pitch) angle of the anamorphic lens 20'. Alternatively, the forward support structure 56 could comprise first and second rods that are hinged at a rotary joint similar to that used in a conventional cymbal stand, wherein the first rod extends within or through and is supported by a collar depending from the forward end 32.1 portion of the track 32, and with the second rod operatively coupled to the supplemental optic system 20, wherein the first rod is rotatable within the collar so as to provide for an associated yaw adjustment, the first rod is slideable within the collar so as to provide for an associated height adjustment, the associated rotary joint provides for an associated pitch adjustment, and the position of the first rod within the collar and the position of the rotary joint are both fixed by corresponding associated adjustment screws.

Accordingly, the relative axial position of the supplemental optic system 20 relative to the light projector 18 and the relative azimuthal orientation of the light projector 18 are responsive to the position of the track 32 relative to the projector interface structure 40 by adjusting the position of the fasteners 44 within the slots 36.1, 36.2 of the side flange portions 38.1, 38.2 of the track; the relative azimuthal orientation of the supplemental optic system 20 relative to the light projector 18 is responsive to the azimuthal angle of the forward support structure 56 relative to the track 32 that is set by the hinge bolt 58 extending through the upper plate 60 and into the lower plate 62 of the forward support structure 56 and through the track 32 proximate to the forward end 32.1 thereof; and the relative height and elevational orientation of the supplemental optic system 20 relative to the light projector 18 is responsive to height and elevational angle of the anamorphic lens 20' within the frame 68 that is adjusted by the associated knobbed adjusting screws 72. The entire light projection system 12 can be azimuthally pivoted about the center 78 of the support post 28, for example, by action of either threading or unthreading the externally-threaded lower end 28.2' of the cylindrical pipe or shaft 28' in the internally-threaded central portion 48 of the slider 30.

Referring again to FIG. 1, with the relative positions and orientations of the supplemental optic system 20 relative to the light projector 18 adjusted for proper operation of optical portion of the light projection system 12 in cooperation with the associated projection screen 24, the resulting effective centers of gravity 74, 76 of the light projector 18 and supplemental optic system 20, respectively, are separated by a distance D, wherein the location of the slider 30 within the track 32 provides for locating the effective center of gravity 74 of the light projector 18 a distance $D_1$ generally aft of the center 78 of the support post 28 and provides for locating the effective center of gravity 76 of the supplemental optic system 20 a distance $D_2$ generally forward of the center 78 of the support post 28 so as to reduce or eliminate a torque on the support post 28 that would otherwise result from an unbalanced effective weight distribution of the light projection system 12, wherein the track 32 acts as a relatively-centrally-supported double-cantilevered beam that provides for supporting the relatively distally-applied weights $W_1$, $W_2$ of the light projector 18 and supplemental optic system 20, respectively. More particularly, if the effective weight of the light projector 18 is given by $W_1$ and the effective weight of the supplemental optic system 20 is given by $W_2$—wherein the effective weights and associated centers of gravity include the contributions of the associated overhead support system 10—then the torque on the support post 28 is minimized by adjusting the position of the slider 30 within the track 32 so that $W_1 \cdot D_1 = W_2 \cdot D_2$, so as to locate the center of gravity of the light projection system 12 at or relatively close to the vertical projection of the center 78 of the support post 28 when supported by the overhead support system 10. The torque can be eliminated if the line connecting the effective centers of gravity 74, 76 also intersects a vertical projection of the center 78 of the support post 28, and otherwise can be at least minimized.

The overhead support system 10 provides for interfacing with commercially-available interface adapters 46 that are otherwise designed with a standardized configuration for attachment to common ceiling mount components at the approximate center of gravity 74 of the light projector 18.

The following adjustments of the overhead support system 10 provide sufficient degrees-of-freedom so as to provide for supporting of a relatively large variety of combinations of light projectors 18 and supplemental optic systems 20, while providing for optimizing the optical configuration of the resulting light projection system 12: 1) azimuthally pivoting the light projection system 12 about the center 78 of the support post 28, 2) translating the slider 30 along the track 32, 3) adjusting the position of the track 32 relative to the projector interface structure 40 by positioning the associated fasteners 34 within the associated slots 36.1, 36.2 of the side flange portions 38.1, 38.2 of the track 32, 4) azimuthally pivoting the supplemental optic system 20 relative to the light projector 18 by azimuthally pivoting the associated forward support structure 56 relative to the track 32, and 5) adjusting the relative height and elevational orientation of the supplemental optic system 20 relative to the associated light projector 18 by means of the knobbed adjusting screws 72 within the vertically oriented slots 70 of the frame 68 from which the supplemental optic system 20 is supported.

In operation, the overhead support system 10 is fastened to either the ceiling 14 or an overhead surface within the room 16 with a plurality of fasteners through a corresponding plurality of mounting holes 80 spaced around the center 78 of the ceiling mount structure 26. The positions of the fasteners 44 within the slots 36.1, 36.2 in the side flange portions 38.1, 38.2 of the track 32 determines the relative position of the light projector 18 with respect to the track 32, and at least partially determines the relative position of the light projector 18 with respect to the supplemental optic system 20. The net torque acting on the support post 28 from the effect of the combined weights $W_1$, $W_2$ of the light projector 18 and the supplemental optic system 20 is minimized by adjusting the position of the slider 30 along the track 32. The remaining adjustments of the azimuthal orientations of the track 32 relative to the ceiling mount structure 26 and the supplemental optic system 20 relative to the track 32, the height and elevational origination of the supplemental optic system 20 relative to the track 32 are then manually set so as to center the image 22 on the projection screen 24.

Figure 4:
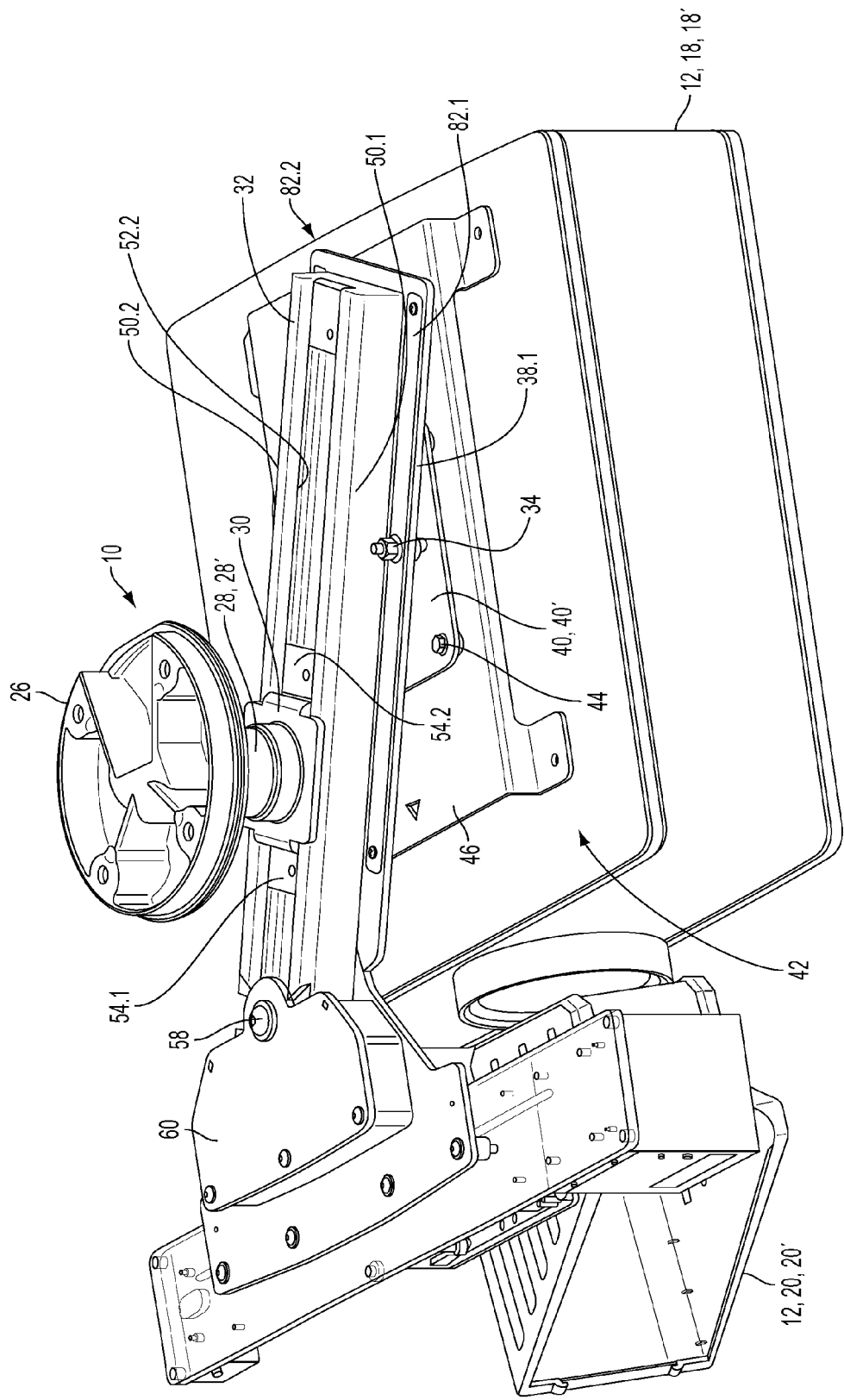
FIG. 4 illustrates a second perspective view of the light projection system and a second aspect of the associated overhead support system illustrated in FIGS. 1 and 2.

For example, referring to FIG. 4, in accordance with a second aspect, the location of the fasteners 44 within the slots 36.1, 36.2 in the side flange portions 38.1, 38.2 of the track 32 may be set by a set of first 82.1 and second 82.2 alignment guides that are each fixed, for example, with either rivets or removable fasteners 84, to the corresponding side flange portions 38.1, 38.2 of the track 32 over the corresponding slots 36.1, 36.2, wherein each of the first 82.1 and second 82.2 alignment guides incorporates at least one mounting hole 86 for purposes of locating the corresponding fastener 44 along the corresponding slot 36.1, 36.2 for purposes of fastening the track 32 to the projector interface structure 40 in the particular orientation that is suitable for the associated light projection system 12. Accordingly, the first 82.1 and second 82.2 alignment guides would be prefabricated with mounting holes 86 pre-drilled for a particular combination of light projector 18 and supplemental optic system 20. For example, in one embodiment, the first 82.1 and second 82.2 alignment guides are constructed from relatively thin metal strips that can be produced in arbitrary quantities for a relatively low cost so as to provide for economically customizing the overhead support system 10 for any particular application.

Figure 5:
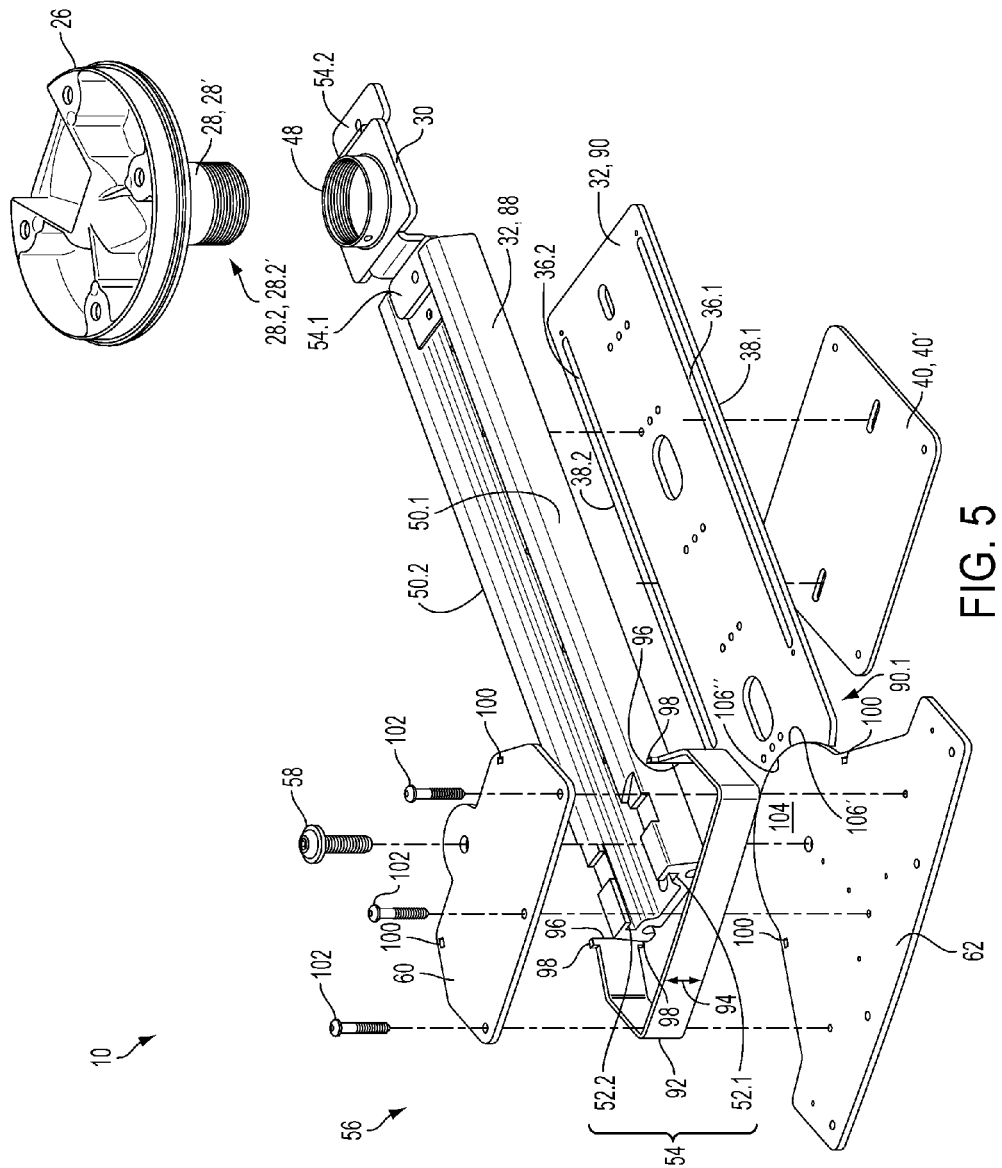
FIG. 5 illustrates an exploded view of the first aspect of the overhead support system illustrated in FIG. 3.

Referring to FIG. 5, in accordance with one embodiment of the first aspect of the overhead support system 10, the track 32 comprises first 88 and second 90 portions that are joined together, for example, with either rivets, removable fasteners, welds or adhesive bonding. For example, the first portion 88 comprises a linear aluminum extrusion incorporating the longitudinal sides 50.1, 50.2 and the associated internal longitudinal grooves 52.1, 52.1 that provide for the associated "T-slot" 54, and the second portion 90 comprises a flat plate that is wider than the first portion 88 to as to provide for the associated side flange portions 38.1, 38.2 that incorporate the corresponding slots 36.1, 36.2. Furthermore, in accordance with one embodiment, the forward support structure 56 comprises a "C-shaped" spacer shell 92 interposed between the upper 60 and lower 62 plates so as to provide for separating the upper 60 and lower 62 plates by the width 94 of the spacer shell 92, wherein the open ends 96 of the spacer shell 92 are provided with tabs 98 that engage with corresponding holes 100 in the upper 60 and lower 62 plates, and a plurality of fasteners 102 through the upper plate 60 and into the lower plate 62 provide for clamping spacer shell 92 between the upper 60 and lower 62 plates with the upper 60 and lower 62 plates spaced apart by about the height of the track 32 interposed therebetween so as to provide for azimuthal rotation of the forward support structure 56 relative to the track 32. For example, in one embodiment, the spacer shell 92 is stamped from sheet metal and then bent into shape. The aft portion 104 of the lower plate 62 incorporates a convex arcuate shape 106' that cooperates with a corresponding concave arcuate shape 106" on the forward end 90.1 of the second portion 90 of the track 32.

Accordingly, the overhead support system 10 provides for locating the center-of-gravity of the associated light projection system 12 relatively close to the center 78 of the associated support post 28 so as to provide for reducing the resulting torque on the support post 28, that can be readily adapted to accommodate different associated light projectors 18 and associated supplemental optic systems 20. The overhead support system 10 generally comprises a relatively centrally-supported track 32 from which a light projector 18 and an associated supplemental optic system 20 are supported at relatively distal locations, and for which the relative locations of the light projector 18, the supplemental optic system 20, and the relatively-central support location are relatively adjustable so as to provide for adjusting the location of the center-of-gravity of the supported light projection system 12 to be at or relatively near to the relatively-central support location, wherein the track 32 acts as a centrally-supported beam.

By suspending the track 32 from the slider 30, the adjustment of the relative location of the light projector 18 and the supplemental optic system 20—that provides for the operation and associated optical fidelity of the associated light projection system 12—is independent of the adjustment of the slider 30 along the track 32—that provides for locating the effective center-of-gravity of the light projection system 12 thereat so as to reduce or eliminate an associated torque on the suspendable mount structure 26. Alternatively, it should be understood that the connections to the track 32 and the slider 30 can be juxtaposed, for example, with the track 32 coupled to the support post 28 and with the light projector 18 and the supplemental optic system 20 each coupled to separate sliders 30.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the' or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:
1. An overhead support system for supporting a light projection system, comprising:
 a. a suspendable mount structure;
 b. a track, wherein said track provides for supporting a light projector of the light projection system;

c. a slider adapted to engage with and slide along said track, wherein said slider is operatively coupled to or a part of said suspendable mount structure; and d. a forward support structure operatively coupled to a forward end portion of said track, wherein said forward support structure provides for supporting a supplemental optic system of the light projection system so as to provide for light from to said light projector be processed and projected by said supplemental optic system.

2. An overhead support system for supporting a light projection system as recited in claim 1, wherein said suspendable mount structure incorporates a support post extending therefrom therebelow, wherein said slider is operatively coupled to or a part of a lower end of said support post.

3. An overhead support system for supporting a light projection system as recited in claim 2, wherein said support post comprises a cylindrical pipe or shaft with an externally-threaded lower end that engages a corresponding internally-threaded portion of said slider.

4. An overhead support system for supporting a light projection system as recited in claim 1, wherein said suspendable mount structure is configured to attach to a ceiling of a room.

5. An overhead support system for supporting a light projection system as recited in claim 1, wherein said track comprises opposing first and second longitudinal sides, said first longitudinal side incorporates a first longitudinal groove, said second longitudinal side incorporates a second longitudinal groove, and said slider is engaged with said first and second longitudinal grooves so as to provide for sliding within and along said track in a longitudinal direction.

6. An overhead support system for supporting a light projection system as recited in claim 5, wherein said track comprises first and second portions that are fastened together, said first portion comprises an extrusion incorporating said first and second longitudinal sides, said second portion comprises a plate, said plate incorporates at least one longitudinal slot substantially parallel to said first and second longitudinal sides of said track so as to provide for operatively coupling said light projection system to said track, and a forward portion of said plate incorporates a hole through which said forward support structure is fastened.

7. An overhead support system for supporting a light projection system as recited in claim 1, further comprising a projector interface structure, wherein said projector interface structure comprises a plate that can be fastened to a top portion of a light projector of the light projection system, and said projector interface structure is supported from said track.

8. An overhead support system for supporting a light projection system as recited in claim 7, wherein said projector interface structure is operatively coupled to said track with at least one fastener through at least one slot in at least one of said track and said projector interface structure so as to provide for adjusting a spacing between said light projection system supported by said projector interface structure and said supplemental optic system supported by said forward support structure.

9. An overhead support system for supporting a light projection system as recited in claim 8, further comprising at least one alignment guide operatively coupled to said track, wherein each said at least one alignment guide incorporates at least one corresponding hole at a corresponding at least one fixed location that provides for locating said at least one fastener relative to said at least one slot corresponding to a particular said light projector and a particular said supplemental optic system.

10. An overhead support system for supporting a light projection system as recited in claim 7, wherein said projector interface structure provides for adjusting a roll tilt of said light projector about an optic axis of said light projector.

11. An overhead support system for supporting a light projection system as recited in claim 1, wherein said forward support structure is operatively coupled to said forward end portion of said track with a vertical pivot that provides for adjusting a yaw angle of said supplemental optic system relative to said track.

12. An overhead support system for supporting a light projection system as recited in claim 11, wherein said forward support structure incorporates a pair of slotted arms between which said supplemental optic system is mounted so as to provide for adjusting both a height and a pitch angle of said supplemental optic system relative to said track.

13. An overhead support system for supporting a light projection system as recited in claim 1, wherein said forward support structure incorporates at least one slot that provides for adjusting a height of said supplemental optic system relative to said track.

14. An overhead support system for supporting a light projection system as recited in claim 1, wherein said forward support structure is operatively coupled to said supplemental optic system with at least one horizontal pivot that provides for adjusting a pitch angle of said supplemental optic system relative to said track.

15. An overhead support system for supporting a light projection system as recited in claim 1, wherein said forward support structure comprises upper and lower plates and a spacer shell clamped therebetween by a plurality of fasteners operative between said upper and lower plates, and said upper and lower plates incorporate corresponding upper and lower holes that are aligned with one another, so as to provide for cooperating with a vertical pivot that cooperates with said track so as to provide for adjusting a yaw angle of said forward support structure relative to said track.

16. A method of providing for supporting a light projector and a supplemental optic system from above, comprising:

a. providing for operatively coupling the light projector to a track at a first location, so as to provide for supporting said light projector from above by said track;

b. providing for operatively coupling the supplemental optic system to said track at a second location, so as to provide for supporting said supplemental optic system from above by said track, wherein said supplemental optic system provides for processing and projecting light from said light projector;

c. providing for supporting said track from above from a third location along said track; and d. providing for adjusting said third location relative to said first and second locations.

17. A method of providing for supporting a light projector and a supplemental optic system from above as recited in claim 16, wherein said track is cantilevered relative to said third location responsive to the operation of supporting said light projector from above by said track, and said track is separately cantilevered relative to said third location responsive to the operation of supporting said supplemental optic system from above by said track.

18. A method of providing for supporting a light projector and a supplemental optic system from above as recited in claim 16, further comprising providing for adjusting a separation between said first and second locations.

19. A method of providing for supporting a light projector and a supplemental optic system from above as recited in claim 16, wherein the operation of providing for adjusting a separation between said first and second locations comprises providing for adjusting said first location relative to said track.

20. A method of providing for supporting a light projector and a supplemental optic system from above as recited in claim 16, further comprising providing for adjusting a roll angle of said light projector relative to said track.

21. A method of providing for supporting a light projector and a supplemental optic system from above as recited in claim 16, further comprising providing for adjusting a yaw angle of said supplemental optic system relative to said track.

22. A method of providing for supporting a light projector and a supplemental optic system from above as recited in claim 16, further comprising providing for adjusting a height of said supplemental optic system relative to said track.

23. A method of providing for supporting a light projector and a supplemental optic system from above as recited in claim 16, further comprising providing for adjusting a pitch angle of said supplemental optic system relative to said track.

24. A method of providing for supporting a light projector and a supplemental optic system from above as recited in claim 16, wherein the operation of providing for supporting said track from above comprises providing for supporting said track from a ceiling.

25. A method of providing for supporting a light projector and a supplemental optic system from above as recited in claim 16, wherein the operation of providing for supporting said track from above comprises providing for supporting said track from a slider configured to slide along and support said track.

26. A method of providing for supporting a light projector and a supplemental optic system from above as recited in claim 16, wherein said third location is substantially vertically aligned with an effective center-of-gravity of a combination of said light projector and said supplemental optic system when both are connected to said track.

27. A method of providing for supporting a light projector and a supplemental optic system from above as recited in claim 16, wherein the operation of providing for adjusting said third location relative to said first and second locations comprises supporting said track from a slider at said third location, wherein said slider is capable of sliding along said track.

* * * * *